Oct. 22, 1968   T. E. BUTZ ET AL   3,406,513
DEAD END
Filed Dec. 21, 1966   6 Sheets-Sheet 1
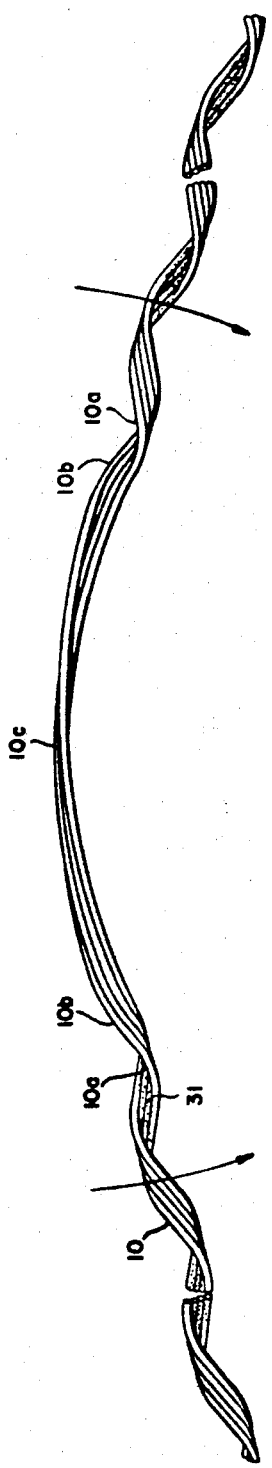
INVENTOR.
Tom E. Butz
Seymour N. Schlein
BY Oct. 22, 1968  T. E. BUTZ ET AL  3,406,513
DEAD END Filed Dec. 21, 1966  6 Sheets-Sheet 2

INVENTOR.
Tom E. Butz
BY Seymour N. Schlein
J. W. Douglas
Their atty

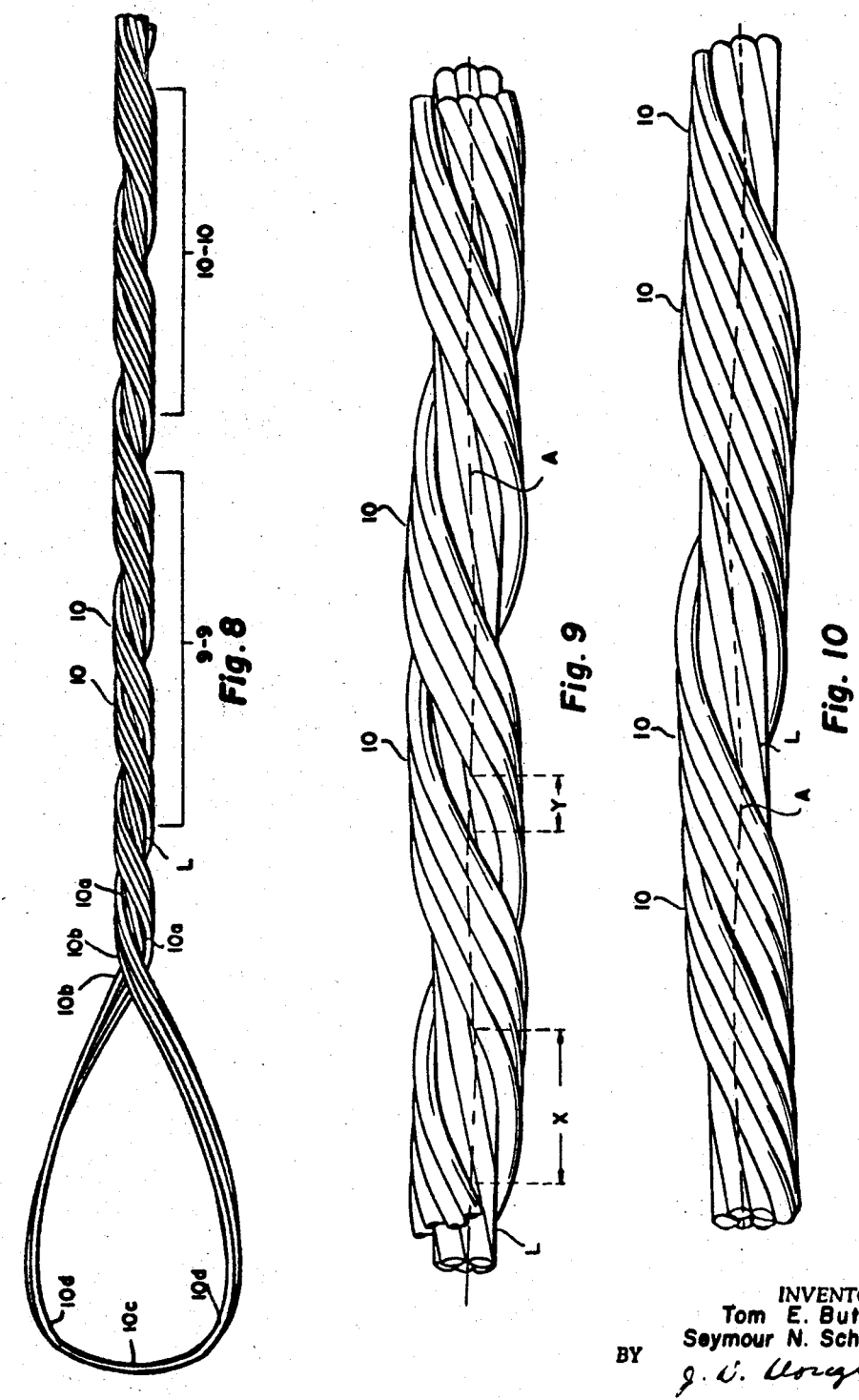

Oct. 22, 1968  T. E. BUTZ ET AL  3,406,513
DEAD END
Filed Dec. 21, 1966  6 Sheets-Sheet 4
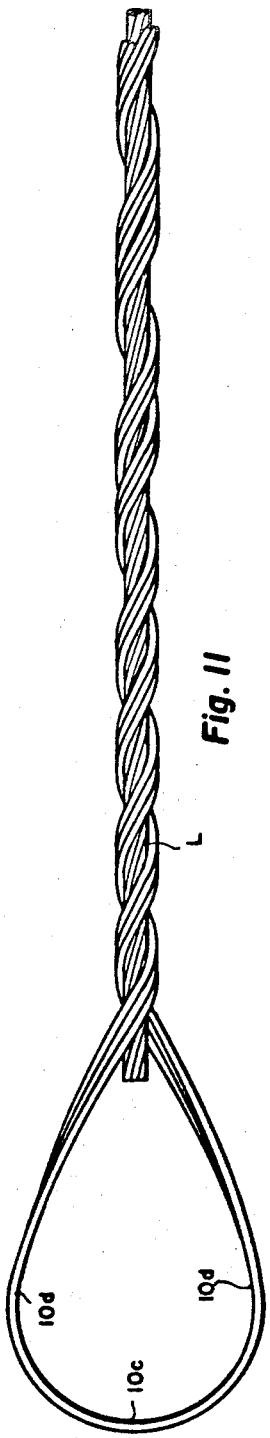
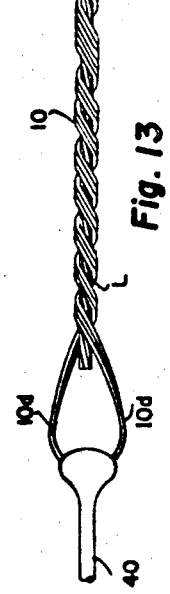
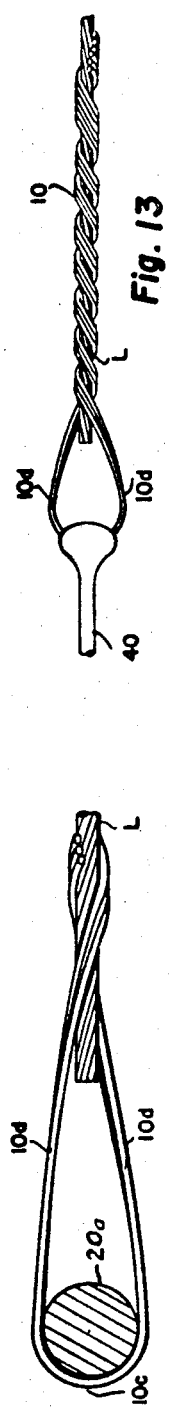
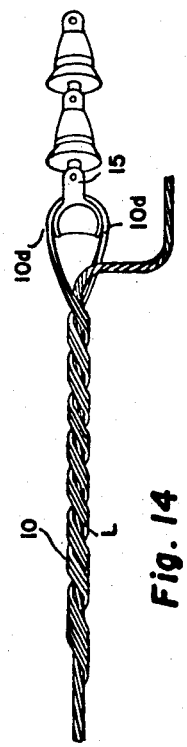
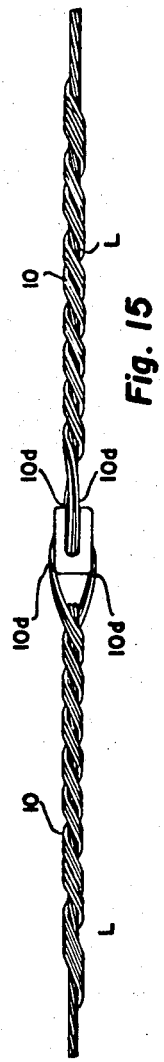
INVENTOR.
Tom E. Butz
Seymour N. Schlein

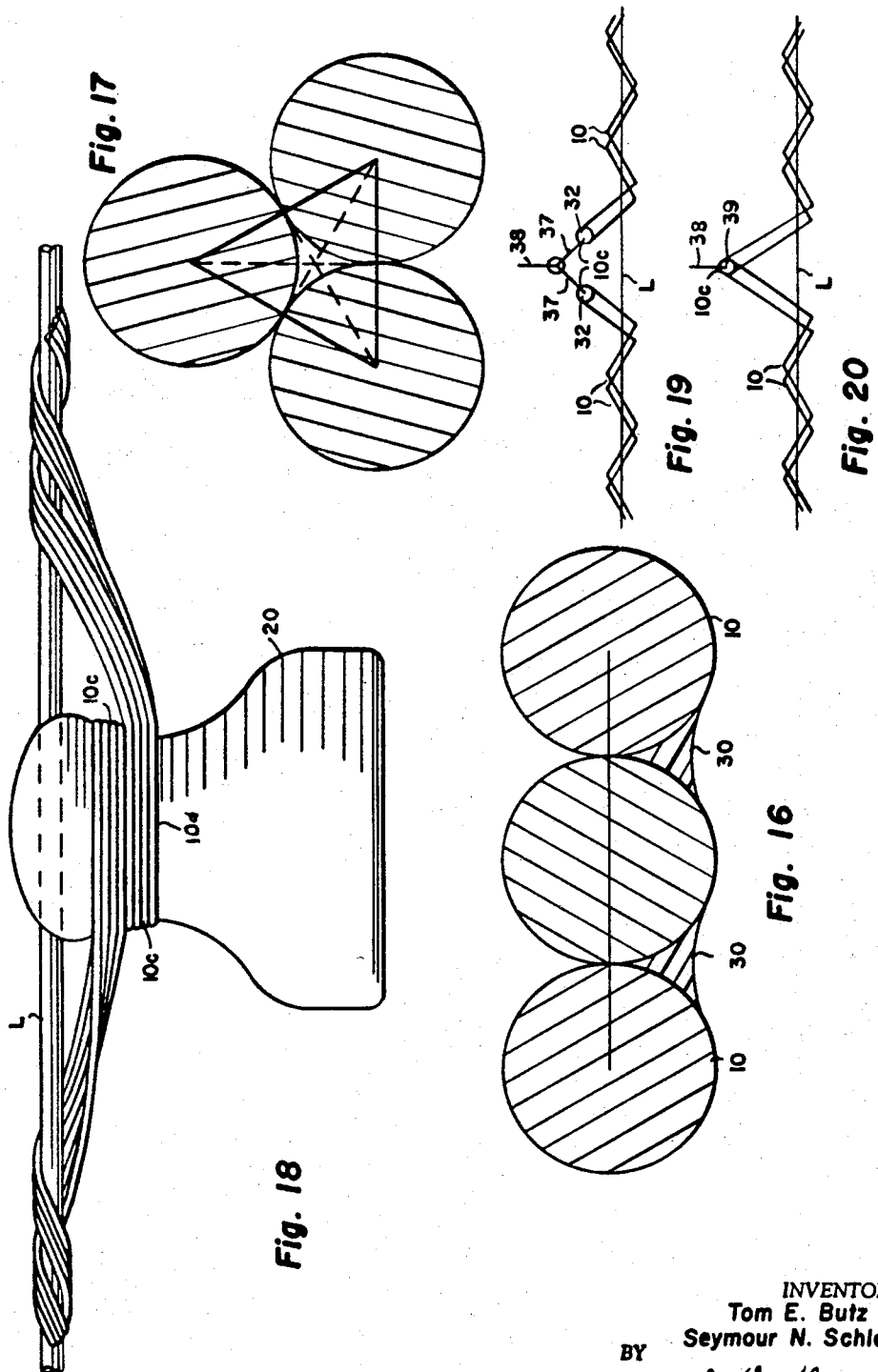

INVENTOR.
Tom E. Butz
Seymour N. Schlein 3,406,513
DEAD END
Tom E. Butz, Chagrin Falls, and Seymour N. Schlein, University Heights, Ohio, assignors to The Fanner Manufacturing Company, a division of Textron Inc., Cleveland, Ohio, a corporation of Rhode Island
Continuation-in-part of application Ser. No. 511,604, Dec. 6, 1965. This application Dec. 21, 1966, Ser. No. 603,605
18 Claims. (Cl. 57—145)

ABSTRACT OF THE DISCLOSURE

An anchoring means for anchoring a fiber glass line having a plurality of lengths of resilient metal in side-by-side relationship with a straight portion in the middle and the ends twisted in a configuration having a lay length of between 50–85%.

---

This application is a continuation-in-part of our allowed application Ser. No. 511,604, filed Dec. 6, 1965, now U.S. Patent No. 3,295,311, which in turn is a continuation-in-part of our application Ser. No. 394,724, filed Sept. 8, 1964, now abandoned.

This invention relates to new, different and unobvious dead ends used in combination with fiber glass lines to provide new, different and unobvious combinations and systems which include such combinations.

Although the principal use of dead ends is for the dead ending of lines, they are also useful as cable suspension means, for use with come-alongs for pulling conductors or lines, and, for service drop grips. The dead ends of this invention are significantly different from and an improvement over those shown in the Selquist Patent 2,202,538 of May 28, 1940, Peterson Patent 2,761,273 of Sept. 4, 1956, and German Patent 1,077,740 of Mar. 17, 1960.

Dead ends are used for gripping cables or strands (e.g., lines) which are used in power transmission and guying of structures. More specifically, they are used to grip an end of a cable for the purpose of transferring the "pull" on the cable to the anchoring structure.

Dead ends are commonly used, for example, to secure a line to a pole, or a guy to a pole or an anchor rod. The line may terminate at the dead end or may proceed from the dead end to a transformer or to a service entrance, when the line is a power line. In the last instance, it is termed a service drop grip.

When the term "line" is used in this specification, it is used in the broad sense and can include, for example, a single wire, a strand made up of a plurality of single wires, and a cable made from a plurality of strands. It also applies to all conductors of electricity and to all lines employed for guying purposes.

Heretofore dead ends for the uses as indicated above were of several general characters, including one type that contemplates preforming or bending wires or rods into preformed helical elements throughout their respective lengths wherein said preformed helical elements had an inside diameter less than that of the lines with the pitch of each wire being long enough so that it could be applied to the line from the side without permanent deformation of the helix. A number of such wires were assembled in side-by-side relationship into a group to form a "half-lay" which was then bent into hairpin form to provide a bight, which was placed in the eye of the anchor rod or insulator, and a pair of legs which were wrapped around the line in balanced relationship. The legs, being helices of smaller inside diameter than the line, engaged and held the line, and form a "whole-lay" around the line.

A whole-lay is one where the helical wire elements, when wrapped around the line, completely encompass the line to which they are applied. A half-lay of helical wire elements is one where the elements, when wrapped around the line, will cover one-half of the line. For example, a dead end that provides whole-lay coverage when assembled on the line cannot accommodate another wire of the same size in each of its legs and at the same time allow all of the elements of the intertwisted legs to maintain gripping contact with the line. When two legs are assembled on the line and the coverage of the circumference of the line is less than about 80–85 percent, the two legs do not form a whole-lay and each leg may be considered to be less than a half-lay. This definition, of course, applies to practical commercial installations and does not apply to situations in which the diameter of the wire elements in the legs of the dead end are very small (non-conventional) or very large (non-conventional) in relation to the diameter of the line.

The present invention is concerned with dead ends of the general character of those using helically preformed wires.

The preformed dead ends of the prior art were found to have had certain significant shortcomings which the present invention overcomes.

Prior dead ends were ordinarily made from wires or rods, each of which was first formed into a helix throughout its length, then the elements were assembled into a half-lay and bent into hairpin form to provide a bight at one end and a pair of half-lay legs. The bight was then disposed in or on an insulator or the eye of an anchor rod, and the legs wrapped around the line as a whole-lay to thus anchor the line. Such devices had a helical formation in the bight which imparted a spring-like character thereto. More particularly, portions of the bight starting at the crossover point acted as coil springs.

In a modification of this prior dead end, the wires in the bight were provided with a hard closed twist or cabled loop so that the bight would more readily accommodate itself to the hardware with which it was assembled. The bight, however, still had spring-like characteristics.

It was long known to those skilled in the art that the helical formation in the bight resulted in crossed-over wire elements causing notching, nicks, or cutting of the underlying elements which resulted in premature failure. This, however, was overlooked in favor of what was thought to be the advantageous characteristics of the helical formation in the bight.

One recognized disadvantage of a helical formation in the bight is the fact that as tension is exerted on the dead end, unwrapping or peeling of the legs from the line first occurs near the bight end, because the helical wires in the bight do not adequately resist the unwrapping torsion. Because of the unwrapping the holding power is decreased as the tensile load is increased. This disadvantage was compensated for by providing an extra amount of contact length in the legs of the dead end. Also, this unpeeling action has the additional disadvantage, in the case of fiber glass rods or ropes, of subjecting the rod or rope to torsional forces. Many types of fiber glass rod and rope are sensitive to torsion which weakens the rod or rope at that point causing premature failure.

Prior art preformed dead ends were intentionally arranged so that the respective legs were in 180° balanced relationship with each other. This balanced relationship was assured by the whole-lay and half-lay design in which the legs were positively positioned with respect to each other. It has been discovered that if the gripping of the legs wrapped about the line is of an engineered unbalanced nature, as in the present invention, wherein the unbalance is accomplished primarily by using dead end grips having legs which do not constitute half-lays and do not together form a "whole-lay," the gripping action of the dead end is greatly improved.

While an unbalanced gripping action might be expected to have some effect upon a pliable line, it is surprising that it has any effect upon a stiff or rigid line, but it does. The extent to which the axis of a stiff or rigid line is laterally distorted or deflected in a sinuous manner by the unbalanced gripping forces is difficult to determine.

Another disadvantage of prior art dead ends was that unless the helical legs were in exactly 180° phase relationship, they could not be readily applied because the legs overlapped and interfered with each other. Even with the phasing exact, trouble frequently occurred during installation, because the lineman disturbed the phase displacement during application and the same undesirable results were realized.

In accordance with the present invention, a dead end is provided which has a "straight" bight instead of a helical formation in the bight, and legs which are less than half-lays instead of the half-lay legs of prior art units. This new and unobvious dead end is significantly different from the prior art dead ends and produces different, unexpected, and improved results.

The invention also contemplates new methods of manufacture of dead ends of the above character which impart improved characteristics to the dead ends, making them stronger and giving them longer life.

Still other advantages of the invention and the description of the invention itself will become more apparent from the following description of illustrated embodiments hereof, which description is illustrated by the accompanying drawings and forms a part of this specification.

In the drawings:

FIG. 1 is a broken side elevational view of a preformed helical element made from a wire or rod;

FIG. 2 is an end view thereof;

FIG. 3 is a broken view of several elements formed into a set which is less than a half-lay, this being another stage in preparation of the dead end;

FIG. 4 is an end view of the set of FIG. 3;

FIG. 5 is a broken view of the elements of FIG. 3, in another, later stage of preparation;

FIG. 8 is an elevational view of a dead end installed on a line;

FIG. 9 is an enlarged fragmentary view of a portion of FIG. 8, as indicated by the bracket 9—9, and showing in dashed lines the distortion of the axis of the line when the line is under tension;

FIG. 10 is a similar view taken from the point indicated by the bracket 10—10 of FIG. 8;

FIG. 11 is a view of another dead end on a line;

FIG. 12 is a fragmentary view, on a reduced scale, showing the dead end of FIG. 11 on a small diameter anchoring means;

FIG. 13 is a diagrammatic view showing the dead end of FIG. 11 connecting a line to an anchor rod;

FIG. 14 is a view similar to FIG. 13 showing the dead end of FIG. 11 positioned on an insulator;

FIG. 15 is a view similar to FIGS. 13 and 14, showing a pair of dead ends connecting a pair of lines or guys together by a strain insulator;

FIG. 16 is a diagram showing a cross-section of the non-helical bight portion of a dead end of the invention;

FIG. 17 is a view similar to FIG. 16, showing a prior art structure in a similar location in the bight;

FIG. 18 is an elevational view showing two dead ends securing a line to an insulator;

FIG. 19 is a diagram showing two dead ends used as a line suspension;

FIG. 20 is a view similar to FIG. 19 of another form of suspension; and

Figure 6:
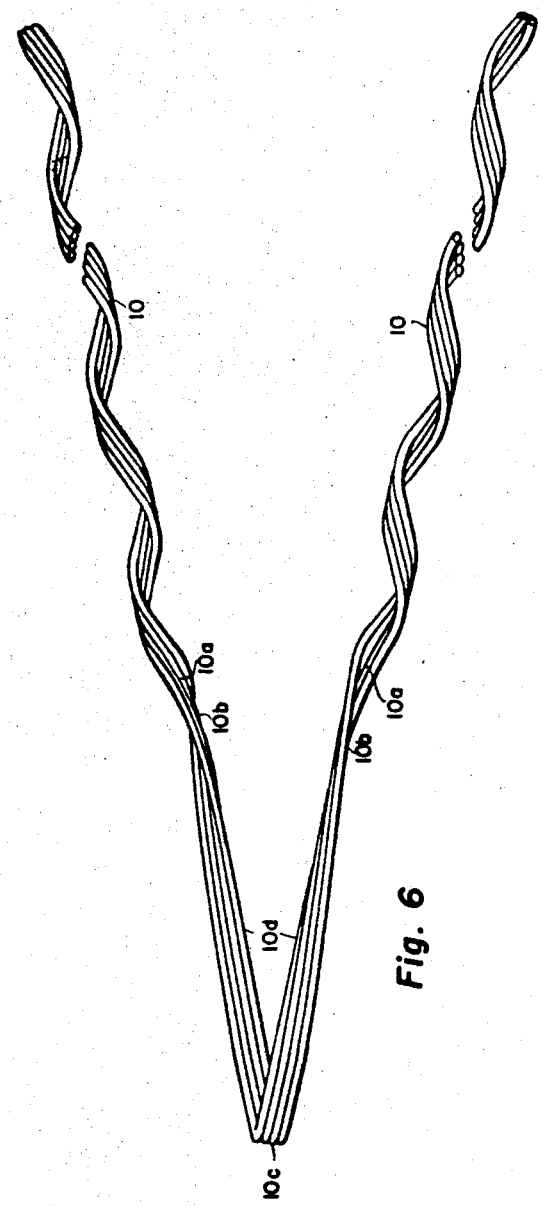
FIG. 6 is a broken plan view of a dead end ready for installation.

Referring now to the drawings, throughout which like parts are designated by like reference characters, and more particularly to the method of manufacture, the first step comprises the formation of straight individual wire into a preformed helical element. This may be done in many ways but preferably is done by taking the wire from a reel, preliminarily straightening the wire in a two-plane straightener, subjecting it to a stress removing device, and then bending it into a helix. A device of this general character is illustrated in the Schane Patent 2,588,663 of Mar. 11, 1952. The helically bent wire is then severed into preformed helical elements of the desired lengths. The ends of the elements may then be chamfered to eliminate any sharp edges. Further stress relief in the wire elements may be produced by baking or light annealing.

The helix thus formed is an open helix of a hard drawn wire, such that it may be applied to a line from its side, without permanent deformation of the helix. Preferably, the pitch length or the axial distance of one complete revolution of the preformed helical element is less than that of the strand or cable and in the same direction as that of the strand or cable. Such a preformed element 10 is illustrated in FIGS. 1 and 2.

Subsequently the elements are cleaned and then assembled into sets of wire elements, as shown in FIGS. 3 and 4. In this step the wire elements are assembled together in side-by-side relation by an endwise threading operation. This assembly is illustrated in FIG. 3. The elements so threaded together or aligned have a common longitudinal axis. The result is a set of less than a half-lay of wire elements in the form of a helical ribbon.

The wire elements so assembled are then sprayed with an adhesive 30, FIG. 16, which performs the function of holding or laminating them together. After the adhesive has set, a suitable abrasive, such as aluminum oxide 31, may be dusted on the interior surface of the helix, FIGS. 3 and 5, to enhance the subsequent gripping action on the line. It is preferred that the abrasive be confined to those portions which will form the legs and contact the line. While the number of wire elements in a set may vary, such a set usually comprises from three to five elements.

The next step is to remove the helical formation from that part of the wire elements which is to become the bight to form the structure of FIG. 5. This is done by engaging the set of wires at two intermediate places 10a spaced apart to generally define the length of the bight portion, and twisting the set between these points in a direction opposite to that of the helix to unwind the same. Simultaneously tension is exerted between the two intermediate places 10a at which the set is gripped, commencing with a low tensile force and increasing to a higher tensile force as the set is unwound. The twisting of the elements to unbend them is such as to exceed the torsional elastic limits of the elements, with the result that, when released, the helical form of the bight portion is removed and the elements in this portion become straightened or non-helical. The amount of tension required will vary with the size and character of the set. As an example, a set could start at a tension of 30 lbs. of force and end at 2000 lbs. of force, which should be within the elastic limits of the elements within the set so that the elements do not shrink in diameter. A unit so formed is shown in FIG. 5.

The set is gripped at the points 10a and the twisting is such that the straightening occurs between the points 10b with the points 10a approximately in phase with each other, thus leaving the straightened portion with the greatest amount of bend adjacent the parts 10a. It will also be noted that the set still has what may be termed some inside curvature. We have found that it is difficult and impractical to straighten out the set completely. That is, although the wires are generally parallel, their axes are in a slightly curved line, transversely of the elements, the curvature of which is greatest at 10b and gradually but significantly diminishes from 10a to 10b (FIG. 5).

A machine which will provide for the twisting and simultaneously tensioning of the wire is illustrated in Patent No. 3,151,437, although other types of apparatus may be used.

Figure 7:
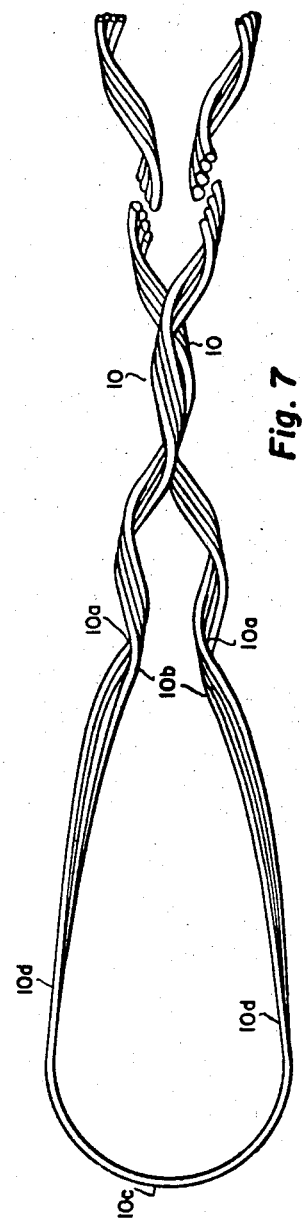
FIG. 7 is a broken view of the dead end of FIG. 6, rotated 90°.

In the next step, the structure is bent in the direction of the arrows (FIG. 5) to the shape shown in FIGS. 6 and 7. At this stage of manufacture the straight bight is formed substantially of straight, non-helical wires.

The preceding operations, and particularly the bending, the twisting and the simultaneous application of tension to unbend that portion that proivdes the straight bight, provides a form of "working-hardening" in the bight. This twisting also applies torsional forces to the center portion of each wire element which, when the dead end is assembled on a line, we believe acts to resist peeling or unwrapping of the legs of the dead end adjacent the bight. In other words, we believe that the twisting operation imparts latent or initial torsion to the unit which resists and acts oppositely to the torsional forces developed as load is applied to the line.

The apex of the bight shown in FIGS. 6 and 7 and the parts extending laterally therefrom to approximately the points 10d, being the support engaging portions, have now lost the transverse curvature and the elements in this portion now have their axes parallel and falling on a substantially straight line through their centers.

In its preferred form, the bending is such that the opposite leg and parts of the bight at 10b, because of the bending into a dead end, assume a position where there is a slight phase displacement of the helices in one leg relative to the other leg linearly of the device. Therefore, the points 10a–10b on one side (the far side in FIG. 6) merge into the helical leg longitudinally ahead of the other side and where the points merge with the helical leg the spacing of the legs from each other longitudinally when applied to the line is very close. This makes the start of the helix in one leg ahead of the helix in the other leg. It will be appreciated that although the device is described as being with the revolution in winding clockwise, it would also be effective if the revolution was counter-clockwise.

When the wire elements of FIG. 5 are bent to provide the structure shown in FIGS. 6 and 7, it is preferred that the bight and legs be bent so there is a divergence of the bight and leg portions which is best shown in the drawings (FIG. 6) as being approximately 20° but which may vary. It will be noted that this divergence is in a direction such that the legs must be crossed over each other when they are applied to the line. This causes a distortion in the bight such that the first convolutions in the opposite legs engage the line and facilitates the installation of the remainder of the legs around the line.

As shown in FIG. 7, which is a view at 90° to FIG. 6, the legs cross over each other in spaced relation to each other. The exact place where they cross over depends upon the amount of bending of the elements to form the bight. There could be a divergence of the legs as viewed, if desired. This may be the form of the device as it is shipped to the customer.

The gripping points 10a are selected so that after the dead end is assembled on the line, there is no coil spring formation in the bight beginning at the cross-over point. By way of illustration, reference is made to FIG. 11 in which there is no coil spring formation in the bight. There is, however, prior to assembly on the line approximately one-half revolution of the set throughout the bight. As assembled on the line and viewed from a point on the line, the wire elements in the bight are straight and parallel and together with the line lie in a common general plane. They are bent at their junction with the legs of the dead end on the line only enough to bring about their arrangement in the same general plane as the line.

In one manner of installation of the device, the user attaches a "come-along" between the anchor rod, FIG. 13, and the line L, then threads one of the legs through the eye of the anchor rod 40 until the straight bight engages in the eye and wraps first one leg around the line L and crosses the other leg over the first leg and wraps it around the line (FIG. 8). The line illustrated in FIG. 8 may be either a single solid rod or a strand made of a plurality of wires which are usually three, seven or more. Here the method of application may be such that both legs could be wrapped around the line at the same time. In either event, when both legs are finally around the line, the "come-along" is released and the line is secured. The tension on separate lines may be made more uniform because there is substantially no resiliency in the bight. Obviously the device may be installed on lines or guys which have no tension thereon by simply wrapping the legs around the line.

When applied on the line, the two less than half-lay legs of the dead end of the present invention form an engineered gap or space, as shown in FIG. 8, which permits faster, easier and more foolproof installation than dead ends of the prior art.

An additional advantage of the straight bight configuration resides in the fact that the wire elements which extend through the eye of the anchor rod or eye of the insulator, lie beside each other and each bear against the insulator, thus the strain upon the bight is shared equally among all the elements. There is no element passing over another element and placing pressure on the under element to cause the under element to be dented and weakened. Inasmuch as all of the non-helical wire elements at 10c engage with and conform to the contour of the supports, there is greater electrical contact with the eye of the support, reducing the electrical resistance which may, when it is an anchor rod, be grounded.

In prior art devices, the helical elements of the legs are in 180° balanced phase relationship when applied to the line, whereas as a result of the engineered gaps of the instant invention, the helical elements of the legs are in usage out-of-phase (unbalanced) after application to the line even though the legs could be initially installed in 180° balanced phase relationship. FIG. 9 illustrates the position the partially less than half-lay legs will take when the phase difference is more or less than 180°. It will be seen in that figure that the gap or distance X between wrappings is greater than the gap or distance Y. In FIG. 10, portions of the legs of the dead end lie contiguous to each other, whereby eight wires are adjacent each other and there is a visible gap and unbalanced phase relationship.

One of the advantages of the present invention is that the legs are in or assume an unbalanced relationship and when tension is exerted on the dead end and line, the dead end legs exert unbalanced forces on the line which tend to distort the line, and the axis A of FIGS. 9 and 10 assumes a sinuous line form where it is gripped by the dead end, thereby enhancing the gripping power of the dead end. In addition, no matter how much tension is exerted, up to the breaking point of the wire element, this desirable distortion of the line increases. Still further, the dead end does not slip on the line because of the decrease in size of the line due to the tension, since the legs together form a partial lay on the line and can contract with changes in line size.

It will be apparent that an even greater unbalanced force on the line may be achieved by a reduction in the number of wires or rods which are used to make up a dead end. This provides a substantial gap between adjacent wrapping of the legs on the line. A dead end with three wires is illustrated in FIG. 11. Here again, the changes in phase of the helices are shown as being progressive although they could be the same from one end to the other. Another advantage of a lesser number of wires is the fact the wires may be of larger diameter. This increases the ease of application because the ends of the wires do not have to be split to obviate the wires folding under each other. With the smaller wires it was customary to split the wires apart at the ends because otherwise there was a tendency for the wires to fold under each other. With the larger wires the added stiffness eliminates this "folding under."

An additional advantage resides in the fact that by using a partial layer a larger wire size may be used for the preformed helical elements. The larger wire size provides a larger cross-section of metal relative to the surface area of the wire, decreasing the corrosion rate, and, as pointed out, is easier to apply and remove.

It was previously mentioned that the device of the instant invention is particularly resistant to "peeling." Peeling is the upwrapping of preformed helical elements in the legs adjacent the bight.

The present straight bight formation, unlike a helical bight configuration, is highly resistant to torsional twisting in the bight portion of the grip. When the wires in the bight are aligned with each other, as shown in the figures of the drawings, excluding FIG. 17, illustrated diagrammatically in FIG. 16, the Polar Moment of Inertia for the embodiments shown is about 73% greater than when the wires are not aligned and take the conformation of the prior art, as shown diagrammatically in FIG. 17. The flat configuration is much more resistant to twisting or torsion than the triangular one and this is reflected in resistance to peeling. The result is that the so-called peeling is greatly resisted by the improved structure. The non-peeling effect is enhanced by the unbalanced effects of the legs and is realized because of the partial lay.

Another advantage of the straight bight resides in the fact the wires in the bight may bend more readily and thus readily conform to the support for a greater bearing distance. This is illustrated in FIGS. 11 and 12. The bight in FIG. 11 is shown in the position where it would be as applied to a large diameter support and in FIG. 12 to a support 20a which may be as small as 5/8" diameter. This also illustrates the fact that one size of bight may be used to connect effectively to several different sizes of supports. The bending to the smaller size of support is facilitated by the straight bight which is less stiff than the helical bight.

FIG. 13 shows diagrammatically how the dead end may be used to secure the line to an anchor rod 40.

FIG. 14 is a view similar to FIG. 13, showing a line terminated by a dead end at a pair of insulators which are attached to some form of a support, not shown, the dead end being attached to the saddle 15.

FIG. 15 is a similar view showing a pair of dead ends employed to connect a pair of guy wires or the like together through the medium of a strain insulator.

In FIG. 18 a pair of dead ends are shown tying a line to an insulator. In this instance, the bright of one of the dead ends is placed around the neck of insulator 20 with the legs being wrapped around the line in the same manner as for a dead end. Then another dead end is used with the bight placed above the other bight on the neck of the insulator and the legs wrapped around the line extending in the other direction. Due to the lack of resiliency of the bight 10c–10d there is less movement of the line in the insulator groove. Should one side of the line break, the other side is prevented from falling, due to the improved gripping power. Should the line break at the insulator, both sides of the line will be held by the two separate dead ends.

In FIG. 19 there has been diagrammatically illustrated a suspension system for a line. In this system the support consists of hanger 38 which branches at 37 with a sheave or insulator 32 being located at the end of each branch. A dead end is used at each sheave or insulator, the bight of each dead end being trained over or through the sheave or insulator while legs 10 are wrapped around the line, in much the same manner as in FIG. 15.

In FIG. 20 the hanger 38 supports a single sheave or insulator 39 and the bights of both dead ends are disposed around the sheave or insulator with the legs extending in opposite directions around the line.

Dead ends of the present invention for various sizes of line have been tested against dead ends made according to FIG. 12 of Patent 2,761,273 and for each sized dead end a gain in strength and performance of the new form of dead end was realized.

Examples of some of the dimensions for four typical dead ends of this invention are shown in the chart below.

In the chart below, at the top, A to D inclusive are specific examples of some of the different sizes of strands or conductors for which certain dead ends were designed. In the specification, these have been referred to mostly as "lines" or "guys." Obviously the number of examples has been limited and there is no limitation as to the actual size of strands that could be dead ended by the device of the present invention. In the left-hand column is found the caption "Strand or conductor diameter" at A, B, C and D. These diameters, shown for illustration purposes, range from .327 to .564 inch. Opposite the next lower caption is found the size of wire used in the dead end, which was found to be highly satisfactory for the particular size of line indicated. It is pointed out that these are merely examples of certain sizes that have been "engineered" for efficient operation and that actually these sizes could vary widely and still provide a dead end that is superior and unobviously different from those of the prior art.

The caption "ID/OD" refers to the ratio between the inside diameter of the dead end preformed helical element and the outside diameter of the conductor. It will be noted that since the preformed helical wire element of the dead end has an inside diameter smaller than the outside diameter of the conductor, that this ratio is between .782 and .790.

"Pitch length" is merely the axial distance of one complete revolution of a preformed helical element.

"Application angle" is the angle relative to the axis of the strand or conductor made by the center line of the helical wire where it crosses the axis of the conductor.

"Theoretical grip wires for 100% coverage" is the number of wires required in a dead end to provide complete coverage.

Under the caption "Actual number of grip wires used" there are three wires in each leg, making a total of 6 wires for device A; B and C each have four wires in each leg, making a total of 8; and D has five wires in each leg, making a total of 10.

Below this the final caption "Percent coverage of strand or conductor" indicates the percentage of the strand that is actually covered when both legs are in place. This coverage ranges from 54% for strand C to 77% for strand D, and is exemplary of the desired "partial-lay" (less than whole-lay) coverage of this invention.

CHART

| | A | B | C | D |
|---|---|---|---|---|
| Strand or conductor diameter (inch) | 0.327 | 0.356 | 0.450 | 0.564 |
| Size of individual wires in grip (inch) | 0.128 | 0.121 | 0.102 | 0.162 |
| ID/OD ratio | 0.786 | 0.790 | 0.783 | 0.782 |
| Pitch length (inch) | 2.80 | 3.25 | 3.03 | 5.40 |
| Application angle (deg.) | 27.1 | 24.8 | 29.8 | 22.9 |
| Theoretical grip wires used for 100% coverage | 9.95 | 11.25 | 14.8 | 13.0 |
| Actual number of wires | 3×2=6 | 4×2=8 | 4×2=8 | 5×2=10 |
| Percent coverage of strand or conductor | 60.3 | 71.27 | 54 | 77 |

Dead ends of the present invention has uses and applications for other than electrical utility purposes. For example, these dead ends are applied to fiber glass lines used to guy communication antenna systems. In such systems, metal cables must be avoided because they constitute extraneous metal which interferes with transmission and reception. Prior art, helically preformed dead ends with helical bights, apply harmful torsion and cause harmful peeling with the result that they have not been used satisfactorily for this purpose.

The devices of this invention give outstanding performance when used as a dead end for lines or guys formed of fiber glass lines such as exemplified by flexible fiber glass rope or stiff fiber glass rod. (As used herein fiber glass rope includes stranded or cabled structures of fiber glass filaments coated and/or impregnated with a resin, and fiber glass rod includes all structures of fiber glass filaments coated and/or impregnated with a resin to form a rod structure having a relatively smooth surface. The rod can be ether solid or in tube form, and the tube may be filled with reinforcing material.)

Fiber glass rope, like other rope, contains a certain amount of air space when the filaments are cabled, and when compressive force is applied to the rope the filaments or strands will squeeze in, filling the air space and reducing the diameter of the rope. With dead ends which have whole-lay coverage, the amount of contraction or reduction in diameter of the dead end is limited and hence if any appreciable reduction occurs in the diameter of the rope on which it is secured, the rope will pull free. Upon loading, a whole-lay dead end applies a compressive force to the rope, causing it to reduce in diameter and, in addition, tension due to the load on the rope causes the rope to further reduce in diameter, thereby permitting the rope of reduced diameter to pull out of the whole-lay dead end, which is severely limited in its ability to reduce in diameter. Thus dead ends having whole-lay coverage are not satisfactory on rope since they cannot contract and the rope will tend to pull out. However, with the dead end of the present invention, wherein the gripping of the rope is less than whole-lay coverage, the convolutions formed by the intertwisted less than half-lay legs can contract simultaneously as the rope contracts under load, thus maintaining gripping force on the rope even if the rope diameter reduces.

The gripping or holding power of the present invention, when used as a dead end on fiber glass rods, is outstanding. Tests have been performed comparing the effectiveness of dead ends according to the present invention with helical bight dead ends of the prior art having whole-lay coverage. In tests which have been conducted, lengths of fiber glass rod of varying diameter were gripped at opposite ends with various types and sizes of dead ends. The dead ends were secured in a tensile testing machine and tensile force was applied on the dead end rod assemblies in order to determine the maximum tensile load the assemblies would hold.

Test results revealed that by utilizing straight bight dead ends having less than half-lay legs of the appropriate sizes to dead end the fiber glass rod, the dead ends of the instant invention consistently developed tensile test loads substantially in excess of the tensile test loads developed when the fiber glass rod was dead-ended with prior art helical bight dead ends of the appropriate sizes having whole-lay coverage. In fact in virtually all cases, straight bight dead ends having less than half-lay legs according to this invention consistently developed tensile test loads significantly in excess of manufacturer's rated rod strength, whereas helical bight dead ends having whole-lay coverage usually developed tensile test loads significantly below the manufacturer's rated strength.

The exact reasons for the outstanding performance of dead ends according to this invention when used in combination with fiber glass rods and rope are not completely understood. However, it is believed one important factor is that the gripping force is distributed evenly over the gripped area of the rod, the nature of the gripping being such that no concentration of forces is present at any particular point along the line. It is believed prior art dead ends cause a concentration of stresses in the line at the point where the line enters the gripping device which causes failure at or near this point. In fact, in the tests referred to previously, a number of fiber glass rods which were dead-ended with helical bight dead ends having whole-lay coverage actually broke at a point where the installed rod entered the dead end.

Further, tensile testing was also conducted on potted ends of fiber glass rods which is a standard conventional prior art gripping technique. (In this type of gripping the end portions of the rods are encapsulated by a resin which is allowed to cure inside of metal fittings, whereby the fittings are secured to the ends of the rod. To test the strength of the rod-fitting assembly, the fittings are gripped in a tensile testing device and tension is applied until failure of the assembly occurs.) It was noted that with this type of assembly failure of the rod often occurred at the place where the rod entered the fitting. This indicates a concentration of stresses at this location.

Another important advantage of using a fiber glass rod or rope with a dead end having a straight bight as opposed to a helical bight of the prior art is that no torsional forces are transferred to the fiber glass rod or rope at the point of initial contact of the bight with the rod or rope. A helical bight dead end will induce a torsional stress into a fiber glass rod or rope at the point of contact. Many types of fiber glass rods and ropes are particularly sensitive to such stress, and the presence of such torsional stresses reduces the tensile load or stress required to rupture the rod or rope. It is believed this is another factor which contributed to the rupture of fiber glass rods in the gripped area of the rods when prior art helical bight dead ends, as exemplified in Peterson Patent 2,761,273, were used. Further, the torsional force which is present with the use of a prior art helical bight dead end tends to cause the legs of the dead end to peel from the gripped portion of the rope or rod, thus reducing the area of dead end-line contact and hence the holding force.

Figure 21:
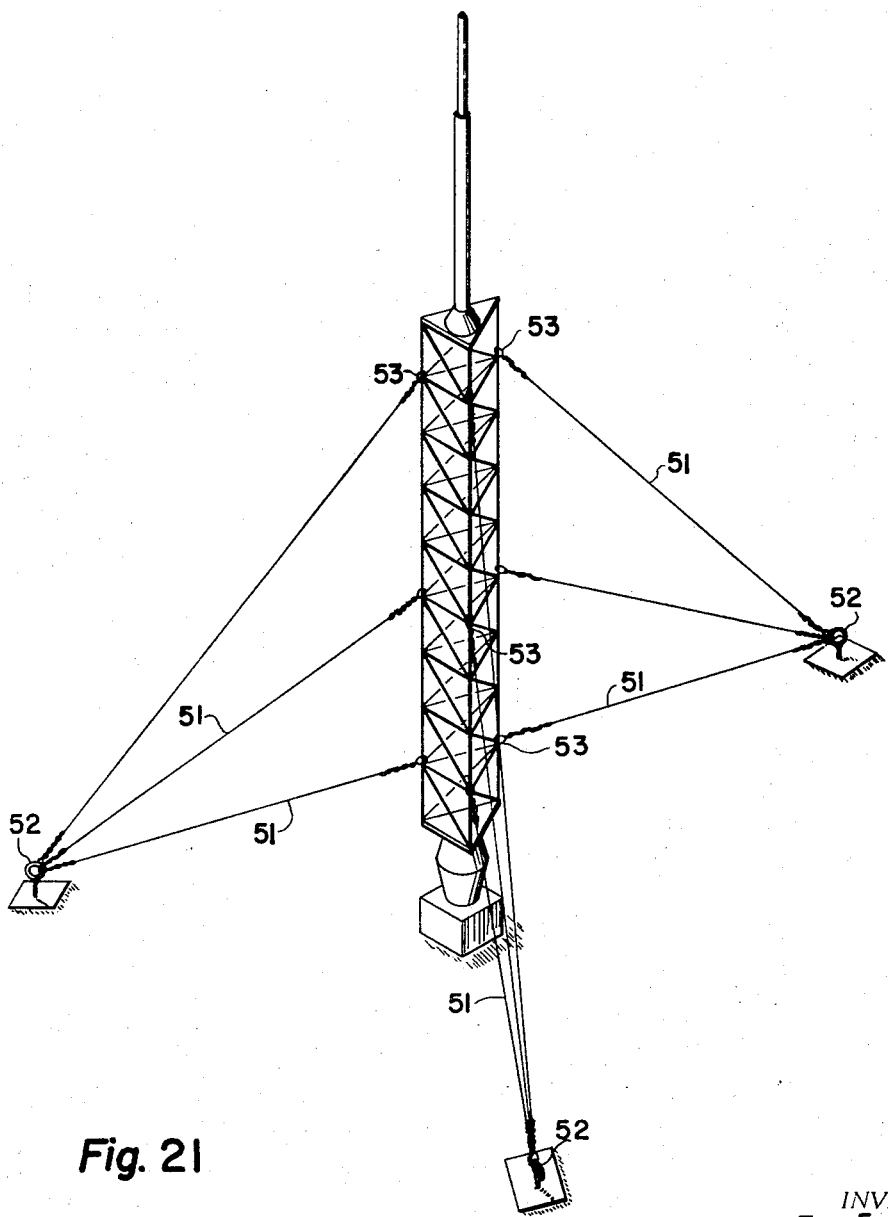
FIG. 21 is a perspective view of an antenna tower guyed with fiber glass lines dead-ended according to this invention.

Referring now to FIG. 21, an antenna tower 50 is shown, guyed with a plurality of fiber glass lines 51 dead-ended both to the tower 50 and to ground anchors 52, with the dead ends installed as shown in FIG. 8. The lines 51 are illustrated as fiber glass rope and hence are continuous from the dead end at the ground anchor 52 to the place of connection 53 to the tower 50. This continuous length of fiber glass is possible since the fiber glass is a dielectric structural material and the length need not be formed from a plurality of short sections less than one-quarter wave length long interconnected by insulators as in the case of steel guys used in many applications. The dielectric properties of the fiber glass line used to guy towers actually improve the efficiency and operation of an antenna tower in many ways. For instance, with transmitting antenna towers guyed with fiber glass line, emitted signal efficiency can be greatly increased by a reduction in the standing wave ratio of the combined antenna and transmission line system. With conventional type antenna towers guyed with steel cable of sections less than one-quarter wave length long the effect of the standing wave ratio, in a system of optimum design, is to reflect in excess of about 8% of the available power back from the antenna to the transmitter. With an identical system guyed with fiber glass line dead-ended according to this invention instead of steel cables this reflection of power back to the transmitter is reduced to less than about 1%. For certain transmitter applications any reduction in reflected power is significant. The dielectric properties of the fiber glass also provide for an increase in the range of the antenna system and a better signal to noise ratio, thus increasing the efficiency of a given antenna. Additionally, the problem of arc over need not be considered in the design of the tower using fiber glass guys dead-ended according to this invention. Many other electrical benefits are derived from the use of a dielectric material as opposed to the use of steel in antenna guy systems, such as an increase in antenna power gain and improved control over unwanted secondary patterns.

In addition to the electrical benefits derived, there are numerous mechanical and/or structural advantages obtained by using fiber glass line dead-ended according to this invention. One very important advantage is the great saving in weight that can be achieved. In fact it is possible to effect over a 90% reduction in the weight of guying material by using fiber glass lines dead-ended according to this invention to replace prior art guys of conventional steel cable of less than one-quarter wave length long sections interconnected by insulators. This reduction in weight has the corollary benefit of a reduction in dead load so important in structural design. Also, because of the ease of installation of fiber glass line dead-ended according to this invention, the time for installing such fiber glass line can be reduced as much as 80%, as compared to the time required to install guys of conventional prior art interconnected lengths of steel cable.

Although FIG. 21 illustrates the use of fiber glass rope for guying and hence a continuous unbroken length for all guy lines, it is to be understood that fiber glass rod can also be used. However, since fiber glass rod normally cannot be coiled or rolled and is supplied in sections, it is often necessary to interconnect two or more sections to provide the necessary length of the guy. Since as explained above, the length of the fiber glass line is not critical with respect to the standing wave ratio, the limits on the line are those imposed by manufacturing, storing and transporting the fiber glass rod. A preferred procedure for interconnecting the sections of fiber glass rod involves the use of splices such as helical formed wires of the type sold by The Fanner Manufacturing Company, Division of Textron Inc., under the trademark "Fannsplice." These are applied in the conventional manner of applying such splices to lines. If desired, the rod sections can be interconnected by insulators in the same manner as prior art lengths of steel guy cable are connected, preferably using dead ends according to this invention. However, this insulator type of connection is more expensive and insulation between sections is not necessary as with steel cable lengths.

A particular advantage of using fiber glass rod dead-ended according to this invention over conventional helical bight whole or full lay dead ends for dead-ending fiber glass rod, is the reduced propensity of splitting or cracking of the fiber glass rod. When prior art helical bight whole or full lay dead ends are used to dead end fiber glass rod, the rod often tends to crack or split in the region of the dead end due to peeling of the dead end legs from the rod at the junction of the bight and the rod. This crack tends to propagate the length of the rod, which is detrimental to the holding power of the guy line.

Although the cost of fiber glass line is presently somewhat more than steel cable of comparable strength, it is possible, by using straight bight less than half-lay leg dead ends on fiber glass line to actually reduce the cost of guy lines in many installations to less than the cost of interconnected sections of steel cable guy lines. This is possible, since often the cost of the insulators and devices for securing the length of cable to the insulators when added to the cost of the cable exceeds the cost of a fiber glass line having only two relatively inexpensive straight bight less than half-lay leg dead ends. Even in the case of interconnected sections of fiber glass rod, a cost saving may be achieved since much longer lengths of rod can be used than the lengths of steel cable, as explained above, and hence fewer connections. This cost saving either cannot be achieved or is not as great if factory applied resin encapsulated type end fittings are used since these factory applied fittings are substantially more expensive than straight bight less than half-lay leg dead ends. Hence a substantial cost advantage is possible over prior art guying practices when fiber glass lines dead-ended according to this invention are employed for guying antenna towers.

Hence by using fiber glass lines, dead-ended according to this invention for guying antenna structures, extensive electrical, mechanical, structural and cost advantages are achieved. Various changes and modifications of the invention can be made and, to the extent that such variations incorporate the spirit of this invention, they are intended to be included within the scope of the appended claims.

We claim:

1. A combination of a line formed of fiber glass and a dead end grip for gripping said line and holding it to anchoring structure, said combination comprising:
   a fiber glass line;
   a grip having a plurality of lengths of resilient metal elements in side-by-side relationship, said elements having an intermediate work-hardened straight bight portion for engagement with said anchoring structure, an open helically preformed less than half-lay leg extending from each of the ends of said bight portion, each of said legs having a smaller inside diameter than the outside diameter of said line, said legs being intertwisted about said line to provide a less than whole lay gripping portion that covers more than 50% and less than 85% of the circumference of said line within said gripping portion and said gripping portion can accommodate at least one other element of the same size and at the same time allow all of said elements in said intertwisted legs to maintain gripping contact with said line; and
   said intertwisted legs being positioned about said line such that one of said legs is unbalanced relative to said remaining leg and said grip has resistance to peeling and slippage.

2. The combination in accordance with claim 1 wherein said dead end grip includes at least three of said elements.

3. The combination in accordance with claim 1 wherein said line is a fiber glass rod.

4. The combination in accordance with claim 1 wherein said line is a fiber glass rope.

5. In combination with a line formed of fiber glass, a dead end, said dead end being formed of a plurality of elements assembled together in side-by-side relationship to form a helical ribbon, said ribbon being bent back on itself to form a bight and a pair of legs, the bight section being a substantially straight section, the elements that form the bight section lying alongside each other with their axes in substantially a straight line transverse to their axes and each element being positioned for discrete engagement with a support, each leg comprising less than a half-lay, the two legs being wrapped around said line and covering not more than 85% of the circumference of the line.

6. The combination of claim 5, wherein said helical legs have a phase displacement from each other sufficient that on the line they are disposed in a range between being closely adjacent to each other and less than 180° from each other.

7. The combination of claim 5, wherein the legs cover more than 50% of the circumference of the line.

8. The combination of claim 5, wherein the line is a fiber glass rod.

9. The combination of claim 5, wherein the line is a fiber glass rope.

10. A combination of a line and a dead end grip for gripping said line, said combination comprising:
    a fiber glass line,
    a dead end grip comprising:
    a plurality of resilient elements;
    said elements each having helically preformed end portions and an intermediate substantially straight portion joining said helically preformed end portions;

each of said elements of said helically preformed end portions substantially conforming as to pitch length and internal diameter;

said elements positioned in side-by-side relationship with one another to form a group;

said group of elements being bent within said intermediate straight portion to form a substantially straight bight section being free of a complete helical revolution;

legs extending from the respective ends of said straight bight section;

each of said legs comprising said helically preformed portions of said elements; and said elements in said group being limited in number to provide upon the intertwisting of both of said legs about said line more than half lay but less than full lay coverage of said line.

11. A guying system suitable for an antenna tower comprising in combination, at least one fiber glass line means, first grip means securing one end of said line means to said tower and second grip means securing the other end of said line means to anchoring structure means, said second grip means having a plurality of resilient elements; said elements each having helically preformed end portions and an intermediate substantially straight portion joining said helically preformed end portions; each of said elements of said helically preformed end portions substantially conforming as to pitch length and internal diameter; said elements positioned in side-by-side relationship with one another to form a group; said group of elements being bent within said intermediate straight portion to form a substantially straight bight section being free of a complete helical revolution; legs extending from the respective ends of said straight bight section; each of said legs comprising said helically preformed portions of said elements; and said elements in said group being limited in number to provide upon the intertwisting of both of said legs about said line means more than half lay but less than full lay coverage of said line means.

12. The guying system of claim 11, wherein said line means is fiber glass rope.

13. The guying system of claim 11, wherein said line means is fiber glass rod.

14. The guying system of claim 11, wherein said line means includes a plurality of interconnected fiber glass rods.

15. A guying system suitable for an antenna tower comprising in combination, at least one fiber glass line means, first grip means securing one end of said line means to said tower and second grip means securing the other end of said line means to anchoring structure means, said first and second grip means each having a plurality of resilient elements; said elements each having helically preformed end portions and an intermediate substantially straight portion joining said helically preformed end portions; each of said elements of said helically preformed end portions substantially conforming as to pitch length and internal diameter; said elements positioned in side-by-side relationship with one another to form a group; said group of elements being bent within said intermediate straight portion to form a substantially straight bight section being free of a complete helical revolution; legs extending from the respective ends of said straight bight section; each of said legs comprising said helically preformed portions of said elements; and said elements in said group being limited in number to provide upon the intertwisting of both of said legs about said line means more than half lay but less than full lay coverage of said line means.

16. The guying system of claim 15, wherein said line means is fiber glass rope.

17. The guying system of claim 15, wherein said line means is fiber glass rod.

18. The guying system of claim 15, wherein said line means includes a plurality of interconnected fiber glass rods.

References Cited

UNITED STATES PATENTS

| | | | |
|---|---|---|---|
| 2,279,625 | 4/1942 | Lancaster | 174—42 |
| 2,943,135 | 6/1960 | Bertling | 174—79 |
| 2,947,504 | 8/1960 | Ruhlman | 57—145 XR |
| 3,042,745 | 7/1962 | Williams | 24—131 XR |
| 3,051,278 | 8/1962 | Smythe. | |
| 3,080,631 | 3/1963 | Ruhlman | 57—145 XR |
| 3,183,658 | 5/1965 | Peterson | 57—145 |
| 3,267,658 | 8/1966 | Schlein | 57—145 |
| 3,283,492 | 11/1966 | Little | 57—145 |
| 3,315,457 | 4/1967 | Stirn | 24—131 |

FRANK J. COHEN, *Primary Examiner.*

DONALD E. WATKINS, *Assistant Examiner.*